US006181683B1

(12) United States Patent
Chevillat et al.

(10) Patent No.: US 6,181,683 B1
(45) Date of Patent: Jan. 30, 2001

(54) PACKET DATA TRANSMISSION IN CODE-DIVISION MULTIPLE ACCESS COMMUNICATION SYSTEMS

(75) Inventors: Pierre R. Chevillat, Kilchberg; Roy D. Cideciyan, Rueschlikon; Marcel Rupf, Zurich; Wolfgang H. Schott, Rueschlikon, all of (CH)

(73) Assignee: International Business Machines Corp., Armonk, NY (US)

( * ) Notice: Under 35 U.S.C. 154(b), the term of this patent shall be extended for 0 days.

(21) Appl. No.: 08/973,264

(22) PCT Filed: Jun. 14, 1995

(86) PCT No.: PCT/IB95/00482
    § 371 Date: Dec. 3, 1997
    § 102(e) Date: Dec. 3, 1997

(87) PCT Pub. No.: WO97/00568
    PCT Pub. Date: Jan. 3, 1997

(51) Int. Cl.[7] .......................... H04B 7/216; H04L 12/413
(52) U.S. Cl. ........................... 370/329; 370/335; 370/445
(58) Field of Search .................................. 370/320, 328, 370/329, 335, 336, 337, 342, 347, 352, 353, 355, 445, 462

(56) References Cited

U.S. PATENT DOCUMENTS

| 5,537,414 | * | 7/1996 | Takiyasu et al. ..................... 370/347 |
| 5,668,880 | * | 9/1997 | Alajajian ................................. 380/49 |
| 5,673,259 | * | 9/1997 | Quick, Jr. .............................. 370/342 |
| 5,790,551 | * | 8/1998 | Chan ..................................... 370/458 |
| 5,859,840 | * | 1/1999 | Tiedemann, Jr. et al. ........... 370/335 |
| 5,875,181 | * | 2/1999 | Hsu et al. ............................. 370/320 |

* cited by examiner

Primary Examiner—Min Jung
(74) Attorney, Agent, or Firm—Louis P. Herzberg; Fitch, Even, Tabin & Flannery

(57) ABSTRACT

A system and method for the wireless transmission of data packets in a code division multiple access communication system wherein one of the code division multiple access channels (PRCH) is used in a time-shared fashion for the transmission of the data packets from several transmitting stations (MSy, MSz) to a receiving station (BS).

A request is sent from a transmitting station (MSy) to the corresponding receiving station (BS) of the communication system indicating the destination address to which data packet(s) are to be routed.

Then, registering the transmitting station (MSy) and assigning an unique virtual connection identifier (VCIy) to it.

Next, the transmitting station (MSy) is attached to the code division multiple access channel (PRCH) used for the transmission of data packets.

Then, listening to the downlink of the code division multiple access channel (PRCH) used for the transmission of data packets until the corresponding receiving station (BS) broadcasts that it will be "idle" such that a random access to the code division multiple access channel (PRCH) used for the transmission of data packets is allowed in the next frame.

Next, the transnmission power of the transmitting station (MSy) is ramped up during the next frame until a certain power level is reached.

The data packet(s) and the virtual connection identifier (VCIy) are transmitted over the uplink of the code division multiple access channel (PRCH) used for the transmission of data packets to the receiving station (BS).

The data packet(s) are routed to the destination address.

Access to the code division multiple access channel (PRCH) used for the transmission of data packets is controller by a multiple access protocol based on carrier sensing and collision detection (CSMA/CD).

25 Claims, 7 Drawing Sheets

Base station

Mobile station

PACKET DATA TRANSMISSION IN CODE-DIVISION MULTIPLE ACCESS COMMUNICATION SYSTEMS

TECHNICAL FIELD

The present invention concerns communication systems employing Code-Division Multiple Access (CDMA).

BACKGROUND OF THE INVENTION

Current digital cellular systems such as the Global System for Mobile Communication (GSM) or the Digital Cellular System 1800 (DCS-1800) in Europe, and the Personal Communication Networks (PCN) planned in the U.S. support mainly voice, message, and low-rate connection-oriented data services which are not well suited to support packet-based data communication.

Many mobile computer applications, however, require infrequent transfers of single or multiple data packets over the radio link of the mobile communication system. Some of them, e.g., e-mail, tele-shopping and tele-banking, and vehicle-dispatch or fleet management applications may be well served with a store-and-forward short message service. Others, among them terminal emulation, remote access to local area network (LAN) based servers, or credit-card verification require interactive usage, tolerate little delay, and are characterized by a wide distribution of packet length. There is little doubt that future mobile telecommunication systems such as the Universal Mobile Telecommunication System (UMTS) will have to support such data applications with an efficient packet-data service. In fact, the European Telecommunication Systems Institute (ETSI) is already in the process of defining such a service, called General Packet Radio Service (GPRS), as an extension to the current GSM system.

In the sequel, we will consider connection-less packet-data services for UMTS and PCN systems. In particular, we focus on the UMTS system which was developed in a code division testbed (CODIT) project under the umbrella of the Research in Advanced Communications in Europe (RACE) program. The CODIT system employs spread-spectrum transmission and code division multiple access (CDMA) and supports voice, message, and connection-oriented data services. For more details on the CODIT system please refer to "Design Study for a CDMA Based Third-Generation Mobile Radio System", A. Baier et al., IEEE J. Selected Areas Commun., Vol. 12, 1994, pp. 733–743. CDMA systems are of particular interest because they promise higher capacity and more ease of deployment than competing time-division multiple access (TDMA) systems.

It is an object of the present invention to provide a method and apparatus which enables CDMA-based UMTS and PCN systems to support a connectionless packet-radio service.

It is a further object of the present invention to provide a communication system with added functionalities.

SUMMARY OF THE INVENTION

This has been achieved by the transmission of data packets over a code division multiple access wireless channel (PRCH), reserved for data packet services, from a transmitting station (MSy) to a receiving station (BS) of a code division multiple access communication system, comprising the following steps:

sending a request from said transmitting station (MSy) to the corresponding base station (BS) of said communication system indicating the destination address to which said data packet(s) are to be routed, registering said transmitting station (MSy) and assigning a unique virtual connection identifier (VCIy) to it, switching said transmitting station (MSy) to said channel (PRCH), listening to the downlink of said channel (PRCH) until said base station (BS) broadcasts that it will be "idle", i.e. that a random access to said channel (PRCH) is allowed in the next frame, ramping up the transmission power of said transmitting station (MSy) during said next frame until a certain power level is reached, transmitting said data packet(s) and said virtual connection identifier (VCIy) over the uplink of said channel (PRCH) to said base station (BS), and rerouting said data packet(s) to said destination address, the access to said channel (PRCH) being controlled by a multiple access protocol based on carrier sensing and collision detection (CSMA/CD).

DESCRIPTION OF THE DRAWINGS

The invention is described in detail below with reference to the following schematic drawings.

GENERAL DESCRIPTION

Details of the present invention will now be described by means of reference to the enclosed Figures. An implementation of the invention is then given as an example.

The present invention concerns a method and means for its implementation for introducing a connection-less packet radio service into code-division multiple access communication (CDMA) systems.

Figure 1:
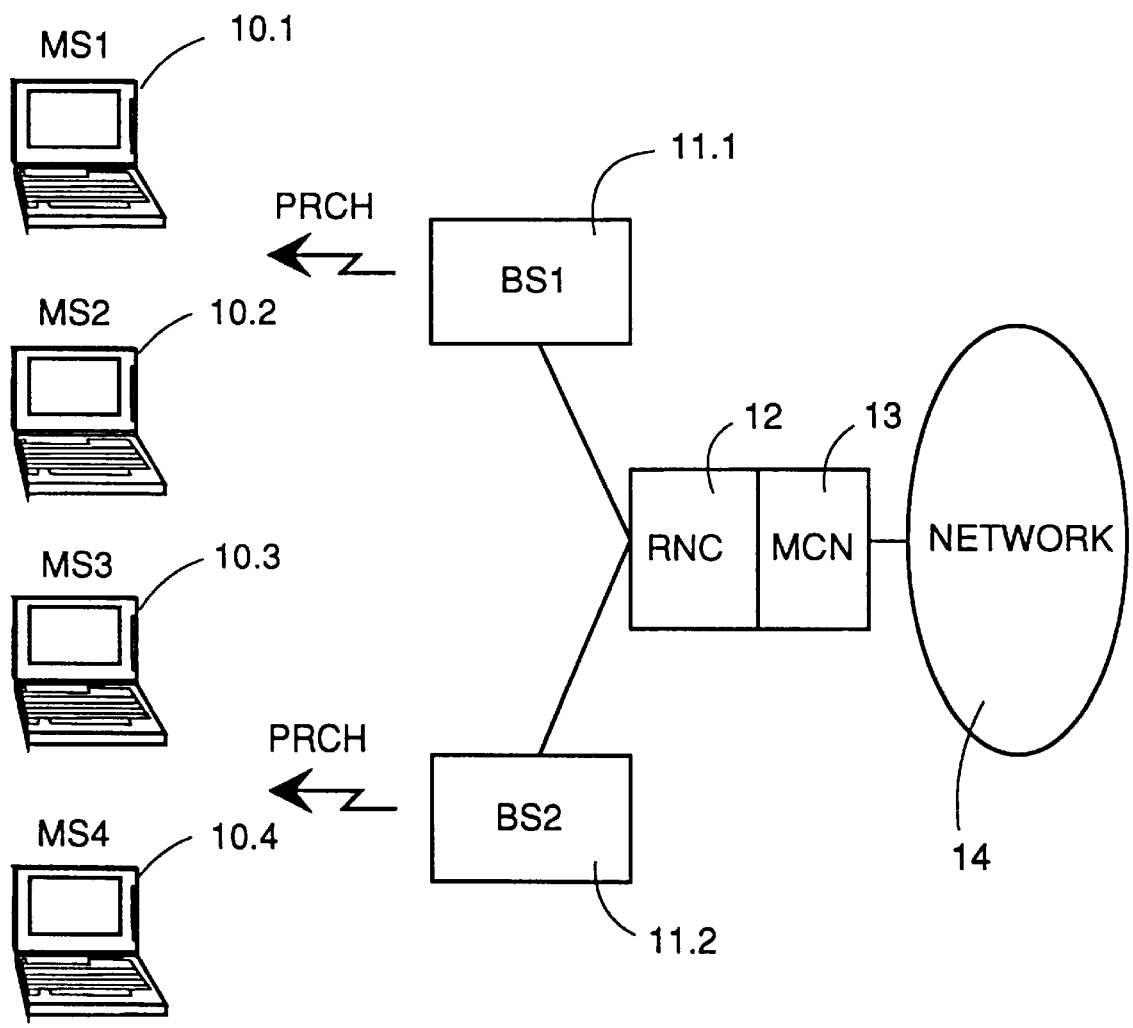
FIG. 1 shows a typical network as defined by CODIT.

A typical CDMA network system is illustrated in FIG. 1. It comprises four different functional entities; the mobile stations (MS1–MS4) 10.1–10.4, the base stations (BS1, BS2) 11.1 and 11.2, the radio network controller (RNC) 12, and the mobile control node (MCN) 13. The RNC 12 is connected via the MCN 13 to a fixed network 14 such as the Internet. This is the architecture we will adhere to when describing the present invention. As outlined in FIG. 1, several base stations communicate with one RNC through one interface. Similarly, a number of RNCs might be connected to one MCN, which in turn connects to the fixed network 14. A MS can be connected to several base stations, i.e. when it is in macro-diversity mode or performs a handover.

If a MS wants to communicate via a wireless network only infrequently, it makes little sense to occupy a connection to a BS, because the user would not be willing to pay for such a connection. Furthermore, it is important to note that there is just a limited amount of channels available within a cell. If all mobile stations within reach of the BS in this cell try to establish a permanent connection, the whole system would be blocked soon. The few permanent channels in such a cell should be reserved for users transmitting and receiving voice and long data frames.

According to the present invention, at least one of the CDMA channels provided by a BS in a cell is now time-shared between several infrequent users, whereas all other channels remain reserved for other users.

In order to support a potentially sizable number of mobile stations, each exchanging packets with the fixed side of the network only infrequently, and to make efficient use of already existing system resources, a new logical channel, to be added to a CDMA-based UMTS or PCN system, such as the CODIT system described in "Design Study for a CDMA Based Third-Generation Mobile Radio System", A. Baier et al., IEEE J. Selected Areas Commun., Vol. 12, 1994, pp. 733–743, is herein disclosed and claimed. This new logical channel is a packet radio channel (PRCH) which is used by a single user or time-shared by several users.

According to the first embodiment of the present invention, access to this PRCH is controlled by the basestation(s) and the radio network controller (RNC). It is also conceivable to employ a separate PRCH controller, which interacts with the BSs and/or RNC.

In order to add as little complexity to the underlying UMTS or PCN system as possible, the physical layer supporting the PRCH is kept largely unchanged. Preferably, a long spreading code is used for the physical data channel (PDCH) and the physical control channel (PCCH), and coherent demodulation is employed for the uplink (UL), i.e. the link between MS and BS, and downlink (DL) PDCH, i.e. the link between BS and MS. The PCCH might be coherently demodulated on the DL and differentially coherently demodulated on the UL. The interference due to packet transmission is similar to that from conventional speech and data channels.

Because a connection built-up takes between 1 and 2 seconds in a conventional CDMA system, which is not acceptable in case of packet data transmission, a different approach had to be sought.

According to the present invention, accelerated power control and channel estimation are helpful to obtain acceptable throughput performance in particular for short packets. In addition, the PRCH coding and interleaving scheme should be carefully optimized to achieve low overhead and delay for short packets while guaranteeing acceptable error protection for long packets.

An implementation of the present PRCH and its integration into the overall system concept are now discussed. The PRCH channel:

The inventive packet radio service is provided to all MSs within a cell of a network system via the PRCH, as shown in FIG. 1. Each BS 11.1, 11.2 establishes and terminates one or multiple PRCHs on request of the RNC/MCN 12, 13. According to the first implementation, the PRCH is a full-duplex, asymmetrical channel that can be operated independently in both directions at variable user data rates, e.g. for the present CODIT system up to 9.6 kbps (narrowband channel) or up to 128 kbps (mediumband channel). The MCN 13 can attach multiple mobile users to a PRCH. Consequentially, mobile users have to register for this service at the MCN before they can get access to the channel. In order to distinguish between different users on the PRCH, the MCN assigns to each MS a virtual connection identifier (VCI) when it grants access. The VCI is represented with q bits and serves as a unique address within the location area, e.g. a micro cell, governed by the MCN. The number q has to be chosen so that all MSs attached to the PRCHs can be addressed individually. The PRCH is preferably structured in 10 ms time slots (frames) to convey fragmented packets between the MS and the network.

The MCN can send user data packets to one or several users on the DL and information for controlling the access and data transfer on the UL. On the UL, the MSs contend for access in short time periods when the channel (PRCH) is indicated "idle". After having gained access, the respective MS transfers the packets to the network. The logical channel PRCH is mapped onto a single physical channel comprising the physical data channel (PDCH) and the physical control channel (PCCH); therefore, only a single basestation transceiver is required for supporting one PRCH. This means that a base station supporting 10 CDMA channels having 10 transceivers now provides 9 CDMA channels and 1 PRCH, according to the present invention. I.e., one of the transceivers is employed to support the packet data service.

Figure 2A:
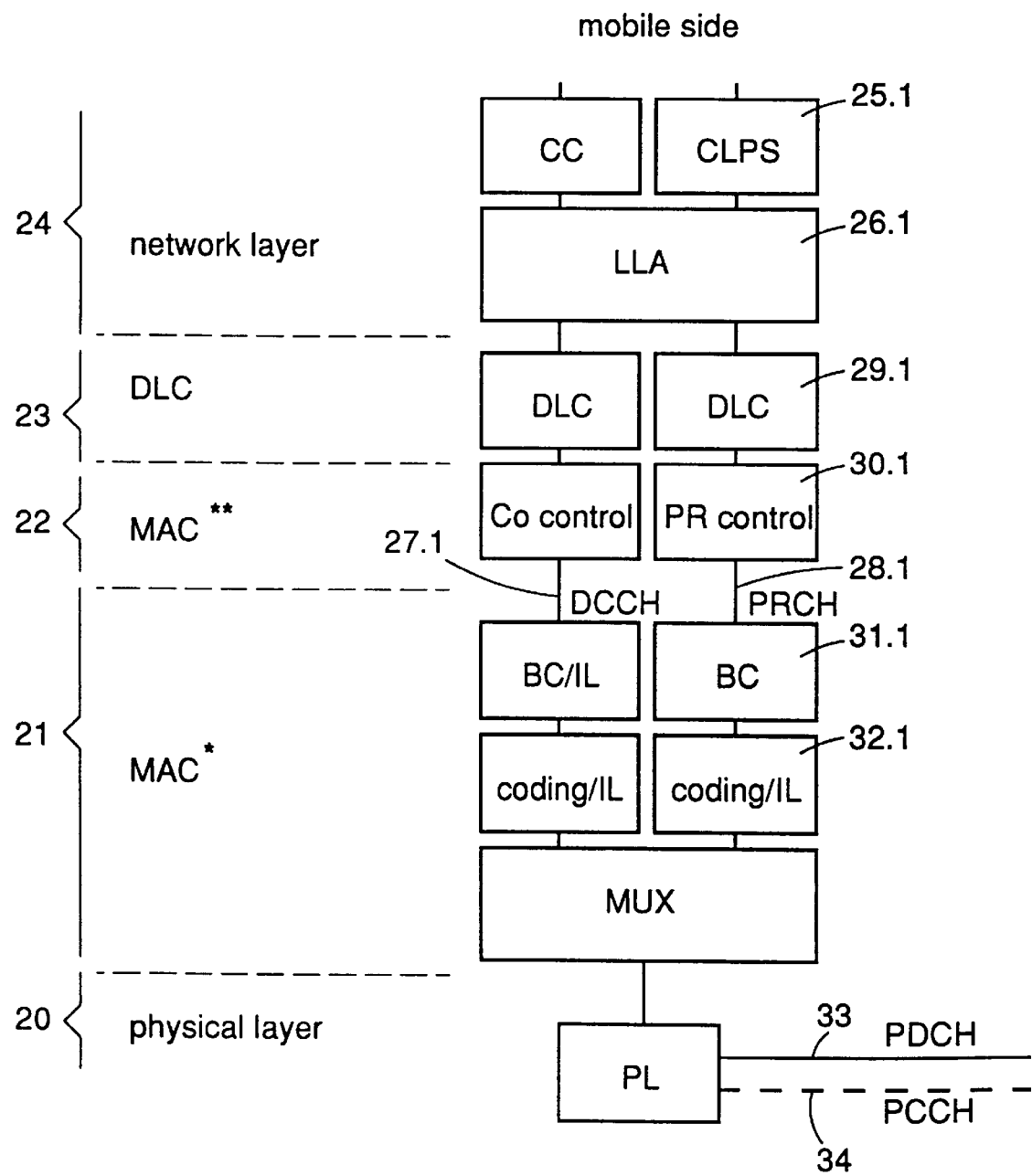
FIG. 2A shows the mobile side of the CODIT protocol architecture, modified in accordance with the present invention.
Figure 2B:
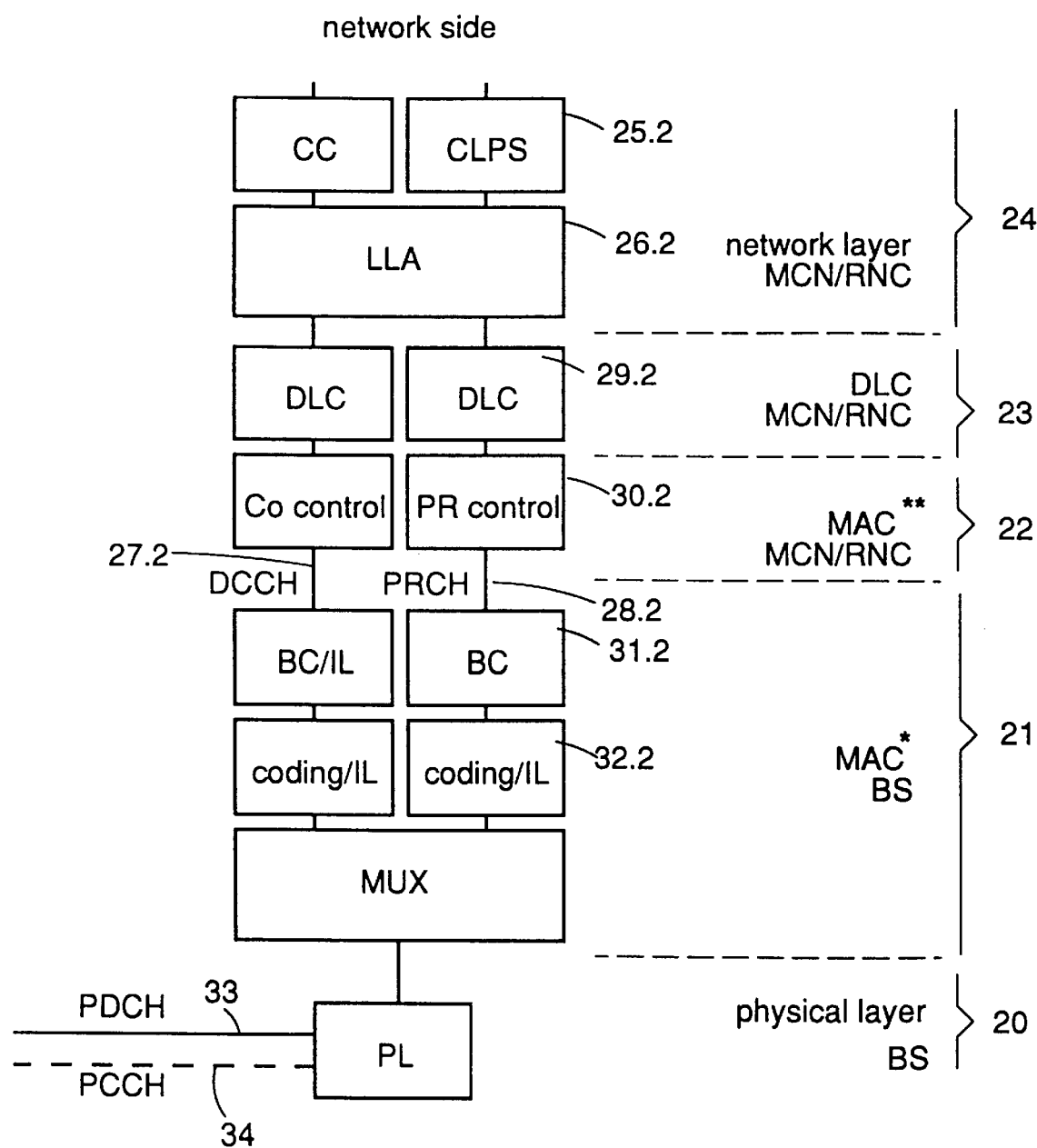
FIG. 2B shows the network side of the CODIT protocol architecture, modified in accordance with the present invention.

FIGS. 2A and 2B illustrate how the PRCH is incorporated into the C-plane of the CODIT protocol architecture. The structure depicted in FIGS. 2A and 2B is layered in accordance with the open systems interconnection (OSI) reference model as described in the article "Radio Protocol Architecture of the CODIT UMTS System: E. Berruto et al., Proceedings of 1994 International Zurich Seminar on Digital Communications, March 1994, Springer, Lecture Notes in Computer Science. The architecture is split into a physical layer (layer 1) 20, a data link layer (layer 2), and a network layer (layer 3) 24. The data link layer is further split into three parts, namely, data link control (DLC) 23, and two medium access control (MAC) parts 21 and 22. The DLC layer 23 is concerned with link establishment, release and maintenance. The lower MAC part 21, depicted as MAC*, may exist in multiple instances, whereas the upper MAC part 22 (MAC) is unique. Physically, the two MAC parts 21 and 22 are separated on the network side because the MAC part resides in a RNC while the lower part MAC* exists in each base station, as indicated in the annotations on the right hand side of FIG. 2B.

The connectionless packet service (CLPS) entity 25.1 of layer 3, i.e. the network layer 24, provides the packet radio service to the mobile user, see FIG. 2A, and the CLPS entity 25.2 on the network side provides all facilities required for registration and authentication of mobile users, see FIG. 2B, assigning and administrating their VCIs, and interfacing to a packet data network. The CLPS entities 25.1 and 25.2 use the logical link administrators (LLA) 26.x to initially route messages via a regular dedicated control channel (DCCH) 27.x to their peer entities. After the MS is attached to the PRCH, all messages exchanged between the CLPS entities 25.x as well as user data packets are always directed via the respective PRCH 28.x. In this case, the control packets and user data packets are passed through the DLC 29.x to the packet radio (PR) control entity 30.x The packets are fragmented and protected with an error control code, e.g. a block code (BC), by a respective unit 31.x for detecting transmission errors on the receiving side. Then they are convolutionally encoded, interleaved (IL) by the entity 32.x, and then transmitted over the PDCH 33. Some control information, e.g. for power control, may also be transferred via the PCCH 34. On the receiving side, see FIG. 2B, the fragments are then reconstructed from the received samples, reassembled to packets, and forwarded to the target CLPS entity 25.2. When the decoder, e.g. a block decoder 31.2 in case of block coded packet transmission, detects the receipt of an erroneous packet fragment, an automatic request for repetition (ARQ) scheme provided in the PR control requests its retransmission.

In the next section it is described how a mobile user can initially be attached to the packet data channel or detached from it.

PRCH attach/detach procedure:

It is assumed that the MS is in the state "broadcast active", that is, the MS receiver has already acquired chip and frame synchronization and listens to the broadcast channel (BCH). Now the following actions are performed in accordance with the present invention:

1. When a mobile user requests the MS to attach its transceiver to the PRCH it performs a regular random access to establish a DCCH 27.1 for exchanging signaling messages only. During this procedure, the MS operates in the state called "random access". This random access is described in the above mentioned article of A. Baier et al.
2. After the DCCH 27.1 is established, the MS is in the state "connection established". The MS can now send the message PRCH_ATTACH_REQ to the MCN indicating the destination address for all packets to be sent.
3. On receipt of the PRCH_ATTACH_REQ, the MCN checks the traffic load on the PRCHs and performs authentication in the location area, registers the MS together with the corresponding destination address, and assigns a VCI to the MS. The MCN allows the MS to access the PRCH 28.1 by sending the message PRCH_ACCESS_GRANT with the parameters VCI and the phase and frame offset between the DCCH 27.1 and assigned PRCH 28.1.
4. When the MS receives PRCH_ACCESS_GRANT, the MS switches its transceiver to the PRCH 28.1 and starts operating in the state "attached to PRCH". In this state, the MS receiver listens to the downlink in order to receive data packets carrying its VCI and control information for the uplink PRCH. If the BS indicates that the uplink PRCH is idle, the MS transmitter may initialize a data packet transfer to the network side as will be described later.
5. When the MS or the RNC intends to detach the MS from the PRCH, a message PRCH_DETACH_REQ is exchanged via the PRCH which switches the MS back to the state "broadcast active".

The following section deals with the data packet transfer via the PRCH.

Data transfer over the PRCH channel:

As other channels in the present CDMA system, the PRCH is mapped onto a PDCH 33 and a PCCH 34 both preferably having a 10 ms frame structure according to the present embodiment. On the PCCH 34, however, a 5 ms subframe structure is superimposed to allow the exchange of access control information in 5 ms time intervals between the MSs and the BS. In order to achieve short delays for the transmission of short packets, a coding scheme is proposed for the PRCH which consists of an inner convolutional code in conjunction with an outer cyclic redundancy check (CRC) code. Whenever decoding of the outer code on the receiver side indicates an error for a fragmented packet, a retransmission is requested. Access to the PRCH is controlled by a multiple access protocol based on carrier sensing and collision detection (CSMA/CD), possibly coupled with a reservation method and provisions for supporting time-critical applications with bounded delay requirements. In the following, mainly the CSMA/CD part of the protocol will be described. Such a CSMA/CD protocol is usually employed in systems where the transmitters can quickly detect idle and collision periods of multiple access channels. CSMA/CD is widely used in local area networks, such as for example the Ethernet (IEEE 802.3 standard). According to the present invention, the carrier sensing and collision detection is provided by the BS, as will be described later in a section headed "CSMA/CD medium access control protocol".

Downlink (DL):

Fragmented user data packets, which have to be conveyed from the RNC to a registered MS via the PRCH, are transmitted on the DL PDCH over the radio link. Control information, which is required to support channel access control and data transfer on the UL, is transmitted from the network side to the MSs either via the DL PDCH or the DL PCCH. On the DL PDCH, for example, retransmission requests of erroneously received packet fragments on the UL are transmitted to the originating MS; of course, these requests can be piggybacked on user data frames. On the DL PCCH, it is advantageous to indicate to all attached MSs, firstly, the data rate presently used on the DL PDCH and, secondly, the data rate to be used on the UL PDCH in the next 10 ms frame or frames. Moreover, a busy/idle flag is broadcasted to all attached MSs indicating whether a random access is allowed in the next frame. All control information is protected to guarantee reliable delivery to the MSs. Finally, some unprotected power control bits are also transmitted on the DL PCCH.

Uplink (UL):

First the case is considered where only one registered MS currently has a packet to transmit.

1. The PR control entity 30.1 in the MS senses the DL PRCH. When the busy/idle flag received via this DL PCCH indicates FOUL idle in the next frame", the PR control 30.1 triggers its transceiver to perform on the UL PCCH a so-called power ramping procedure starting in the next 10 ms time interval.
2. During power ramping, the MS transmits on the UL PCCH a preamble and increases stepwise the transmit power. The MS receiver simultaneously listens to the power control information received on the DL PCCH. If the target power level is reached, the MS stops power ramping and starts tracking.
3. During the reception of the preamble, the BS acquires chip synchronization and estimates the channel. Simultaneously, the BS always broadcasts on the DL PCCH "UL busy in the next frame" to avoid that other MSs start the random access procedure in the next frame.
4. After the power ramping phase, the MS transmits its first encoded packet fragment on the UL PDCH and its VCI in the first UL PCCH 5 ms subframe. If further fragments have to be sent to convey the packet over the radio link, the MS raises a more-frames flag which is also transmitted via the UL PCCH.
5. When the BS detects the VCI, it immediately acknowledges the VCI on the second 5 ms subframe on the DL PCCH. Without getting the acknowledgment, the MS stops transmitting fragments immediately.
6. When the BS receives the first encoded packet fragment and the raised more-frames flag, the BS indicates on the DL PCCH "UL busy in the next frame". The packet fragment is decoded and checked for errors by units 32.2 and 31.2 and then passed to the PR control 30.2.

7. The MS transmits the next encoded packet fragments on the UL PDCH. When the last frame is transmitted, the more-frames flag is switched off in the first subframe on the UL PCCH.

8. The BS decodes the received packet fragments and passes them to the PR control 30.2. As soon as the BS detects the last frame, it broadcasts "UL idle in the next frame" in the second subframe on the DL PCCH to again allow a random access.

Optionally, the MS can transmit over the UL PCCH together with the VCI immediately after power ramping the number of packet fragments to be conveyed over the radio link. After successful reception of these two parameters, the BS indicates on the DL PCCH "UL busy in the next frame" until the number of correctly received fragments equals the announced number. When this option is implemented, there is no need to transmit a more-frames flag over the UL PCCH. It is now considered that there are presently two or more MSs having packets to be transmitted.

All contending MSs perform power ramping as described in phases 1.) and 2.) above, except that the BS limits the total power of all contending MSs to the target power. In phase 3.), the BS regularly starts reception and avoids new contenders. Then, the contending MSs start transmission as described in phase 4.). If the BS can detect no VCI in phase 5.), it acknowledges none of the contending MSs which forces them to cease transmission immediately and to try to access the PRCH individually some time later to retransmit the whole packet. Additionally, the BS broadcasts on the DL PCCH "UL idle in the next frame" to again allow random access. If the BS can detect the VCI of a MS, however, it acknowledges this (strong) MS which leads the other contenders to cease transmission immediately and to try to access the PRCH individually some time later to retransmit the whole packet. The acknowledged MS and the BS then proceed as it is described in phases 6.) to 8.) above.

Finally, it is considered that none of the registered MSs presently has a packet to transmit.

If the BS fails to detect some signal energy on the PCCH in phase 3.), it broadcasts on the DL PCCH "UL idle in the next frame" in the following frame.

CSMA/CD medium access control protocol: Since the present system is based on a 10 ms frame structure, the use of a slotted MAC protocol with 10 ms PRCH frames corresponding to slots has been adopted. In contrast to the 10 ms frame structure on the PDCH, the PCCH channel employs a 5 ms subframe structure.

Figure 3A:
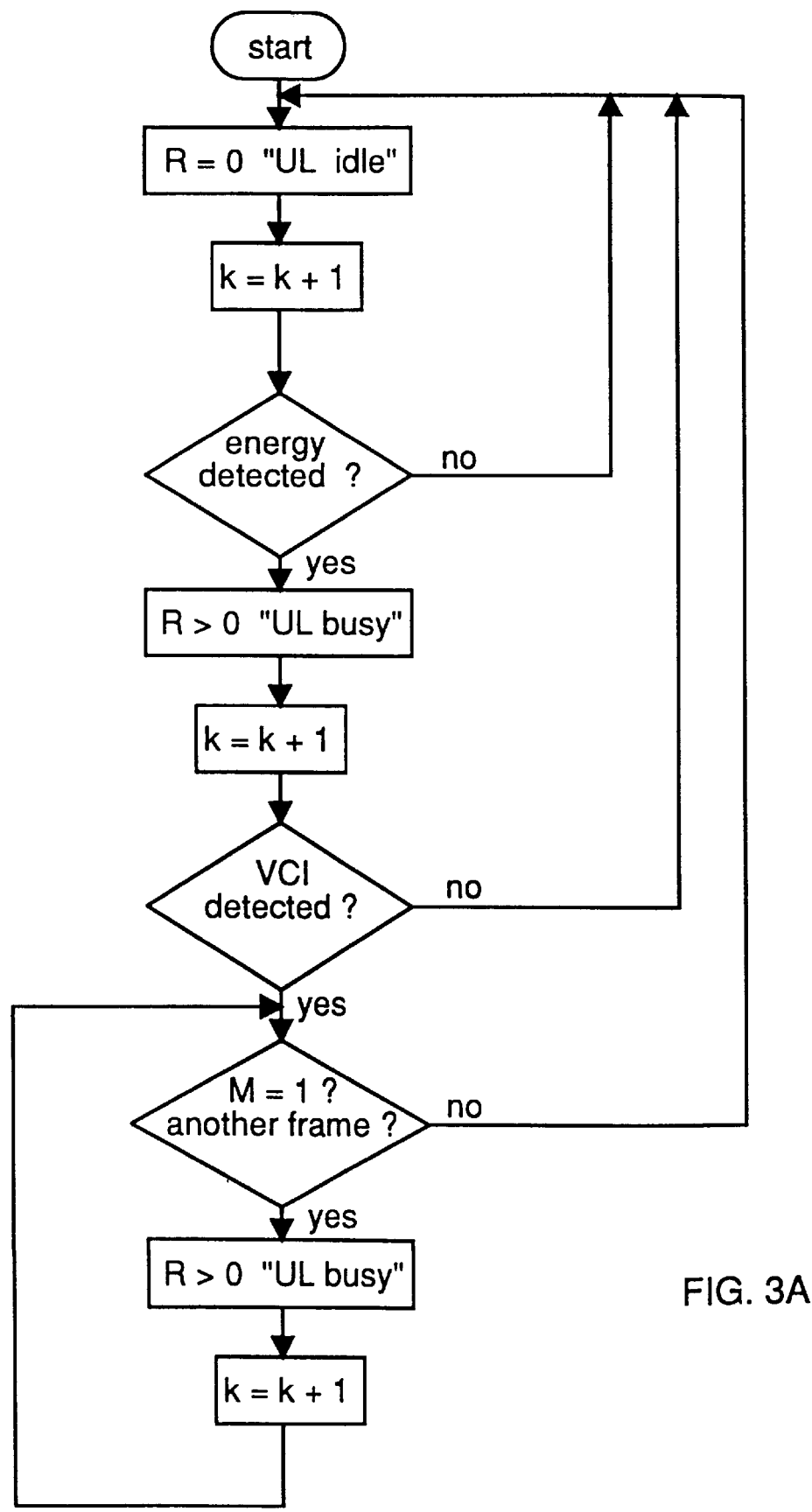
FIG. 3A shows a flow diagram for the medium access control (MAC) protocol in a base station, according to the present invention.
Figure 3B:
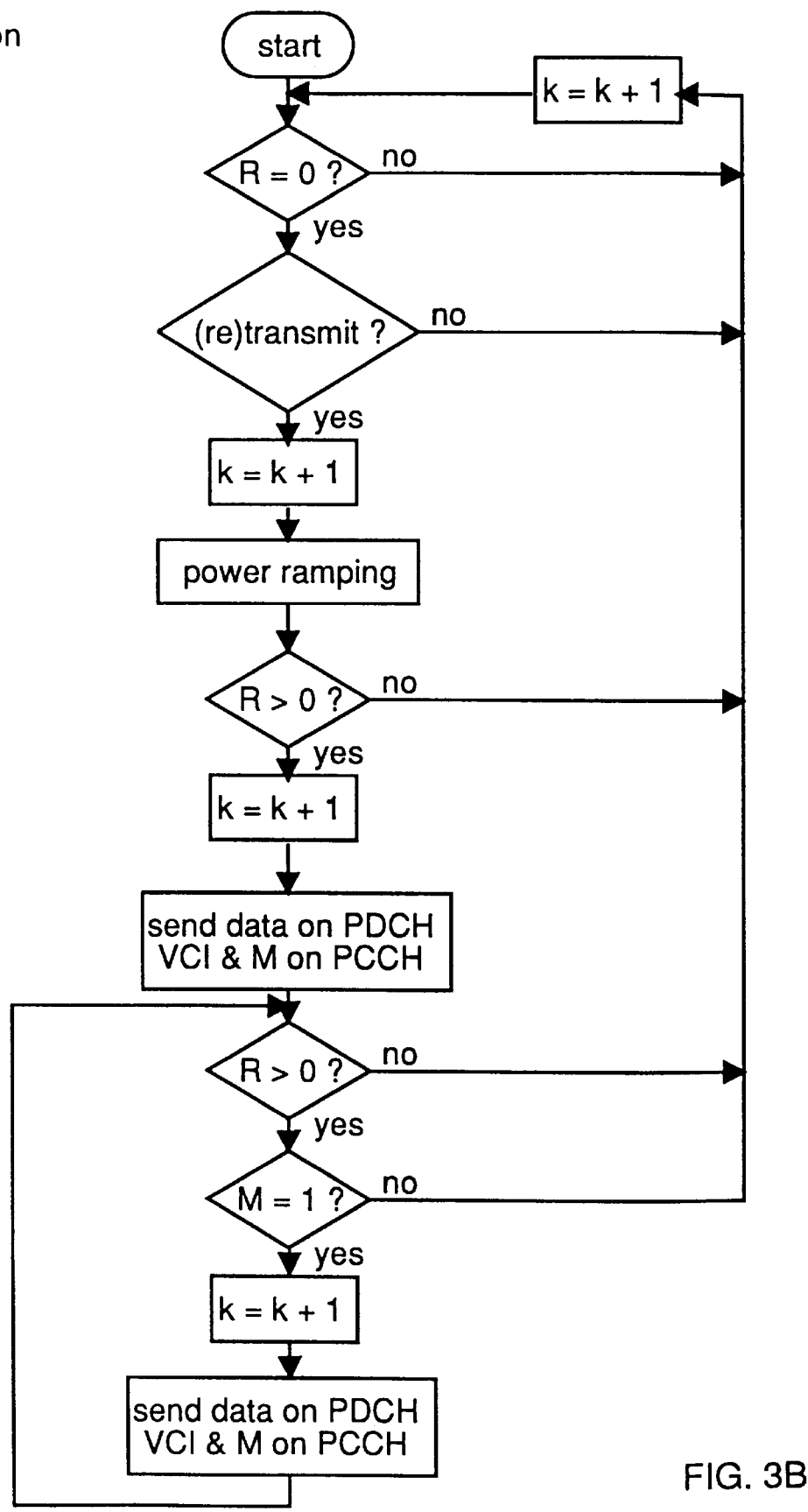
FIG. 3B shows a flow diagram for the MAC protocol in a MS, according to the present invention.

In FIGS. 3A and 3B, the flow diagrams of the UL MAC protocol in the BS and MS are shown, respectively. It is assumed that the time unit corresponds to a 10 ms frame and k denotes the current frame number. The BS indicates on the DL PCCH channel the transmission rate R required on the UL in the next frame. The variable rate R might for example be selected from a predetermined set of transmission rates such that the total interference does not exceed a precomputed threshold.

R=0 implies that the UL will be idle during the next frame. Only after detecting R=0, called carrier sensing, the MSs attached to the PRCH channel may access the UL in the following frame, provided that they have a packet to (re)transmit. According to this scheme, on the UL PCCH channel, the MSs transmit a preamble with an initial power being about 10 to 20 dB below the target power, e.g. indicated by an open loop power control as described in the above mentioned article of A. Baier at al. During the power ramping phase (10 ms), the transmit power of the MS is adjusted according to the power control commands on the DL PCCH channel, which might operate at 2 kbit/s, such that the sum of the total power received from all MSs currently accessing the channel is as close as possible to the target power of the closed loop power control.

The BS indicates that the UL PRCH is "busy" (R>0) or "idle" (R=0) in the following frame depending on whether the total detected signal energy exceeds a predetermined threshold. If R=0, the MSs retransmit the preamble in the next frame in order to access the channel. If R>0, however, the MSs transmit the first 10 ms data frame on the UL PDCH channel at data rate R and the encoded virtual connection identifier (VCI) as well as the more indicator M on the UL PCCH channel. M=1 informs the BS that there are more frames to be transmitted whereas M=0 means that there are no more frames to come. Assuming that the BS succeeds in decoding a single VCI and M=1, it indicates the required UL transmission rate R>0 for the next frame on the DL PCCH. If the BS fails to decode a VCI or detects M=0, it indicates R=0 "idle" for the next frame. Once a MS detects R>0, it continues transmitting data on the UL PDCH if it has another frame to send (M=1).

On the other hand, a MS stops transmitting data after the detection of R=0, because it either experienced a collision—the first frame of the packet is lost and the packet must be retransmitted—or because it sent a packet consisting of one frame only.

Figure 4:
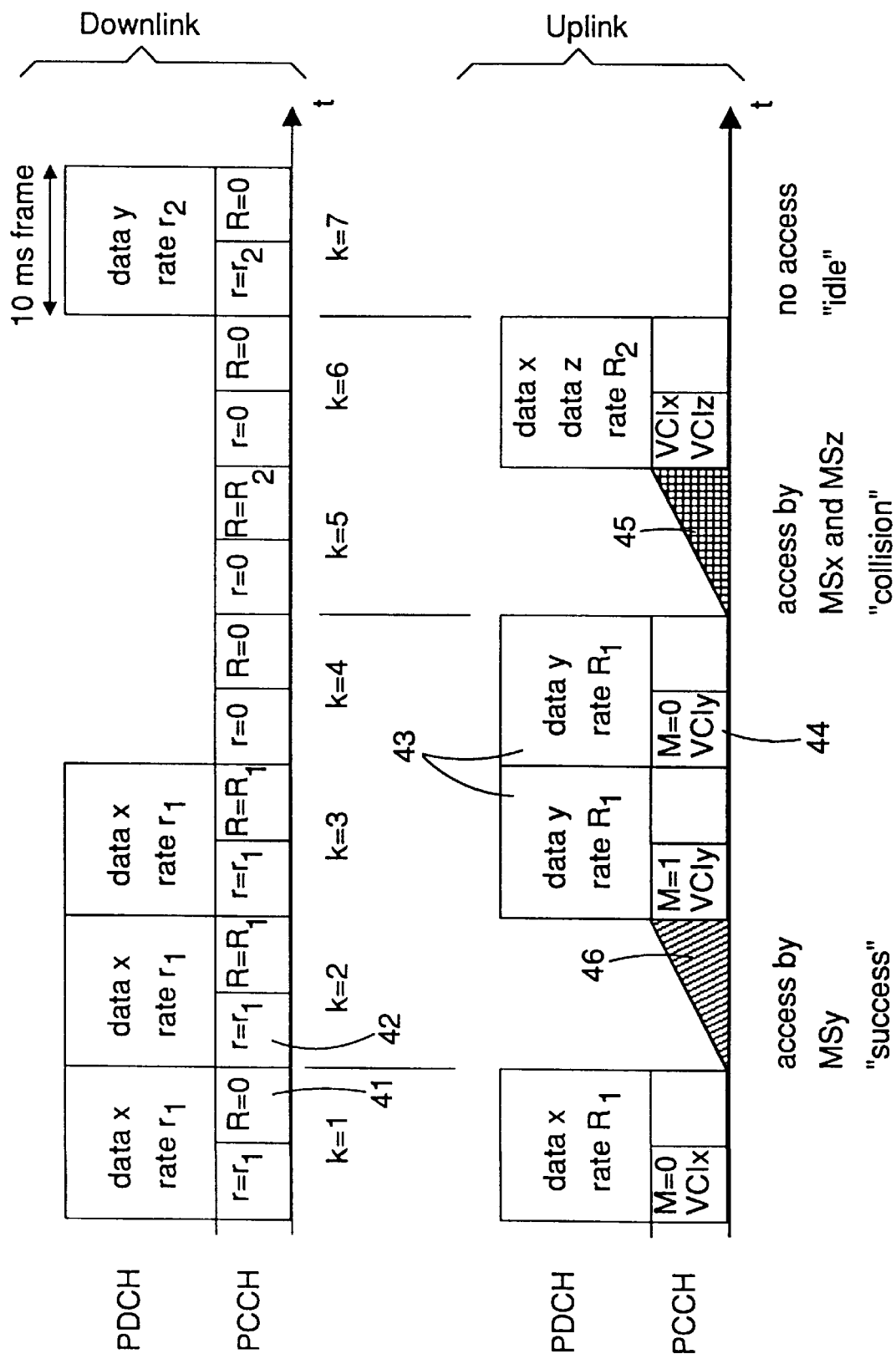
FIG. 4 is a timing diagram for the slotted carrier sense multiple access collision detection (CSMA/CD) protocol, according to the present invention.

The timing diagram in FIG. 4 illustrates the "success", "collision" and "idle" periods on the UL PRCH channel. After detecting the last frame indicator M=0 of MSx during the first 10 ms frame k=1, the BS indicates with R=0 in the second half 41 of the first frame of the DL PCCH channel that the second frame k=2 on the UL will be idle. Since only MSy in the example depicted in FIG. 4 has a packet to transmit, it starts power ramping (hatched triangle 46) during the second frame k=2 on the UL PCCH channel. After the BS has detected some signal energy within the first 5 ms 42 of the second frame, it informs all the MSs that the UL will be busy during the third frame k=3 by indicating the UL transmission rate for the next frame R=$R_1$ on the DL PCCH channel. During the third frame, MSy transmits data at rate $R_1$ on the UL PCCH channel and both the VCIy and M=1 on the UL PCCH channel. The BS decodes the VCIy of MSy and informs again all the MSs that the UL is busy during the fourth frame k=4 by indicating R=$R_1$ on the DL PCCH channel. Since the packet 43 (data y) of MSy is only two frames long, MSy informs the BS with M=0 in the first half 44 of the fourth frame k=4 that the last data frame is being transmitted. After detecting R=0 at the end of the fourth frame, MSx and MSz now attempt to access the UL channel via power ramping (cross-hatched triangle 45) during the fifth frame k=5. Since the BS cannot detect a VCI in the sixth frame, it indicates with R=0 that the UL will be idle during the following frame. MSx and MSz detect the collision and in turn stop transmitting data at the end of the sixth frame k=6. The BS cannot detect sufficient signal energy in the seventh frame k=7 either and the UL remains idle (R=0) during the following frame.

Figure 5:
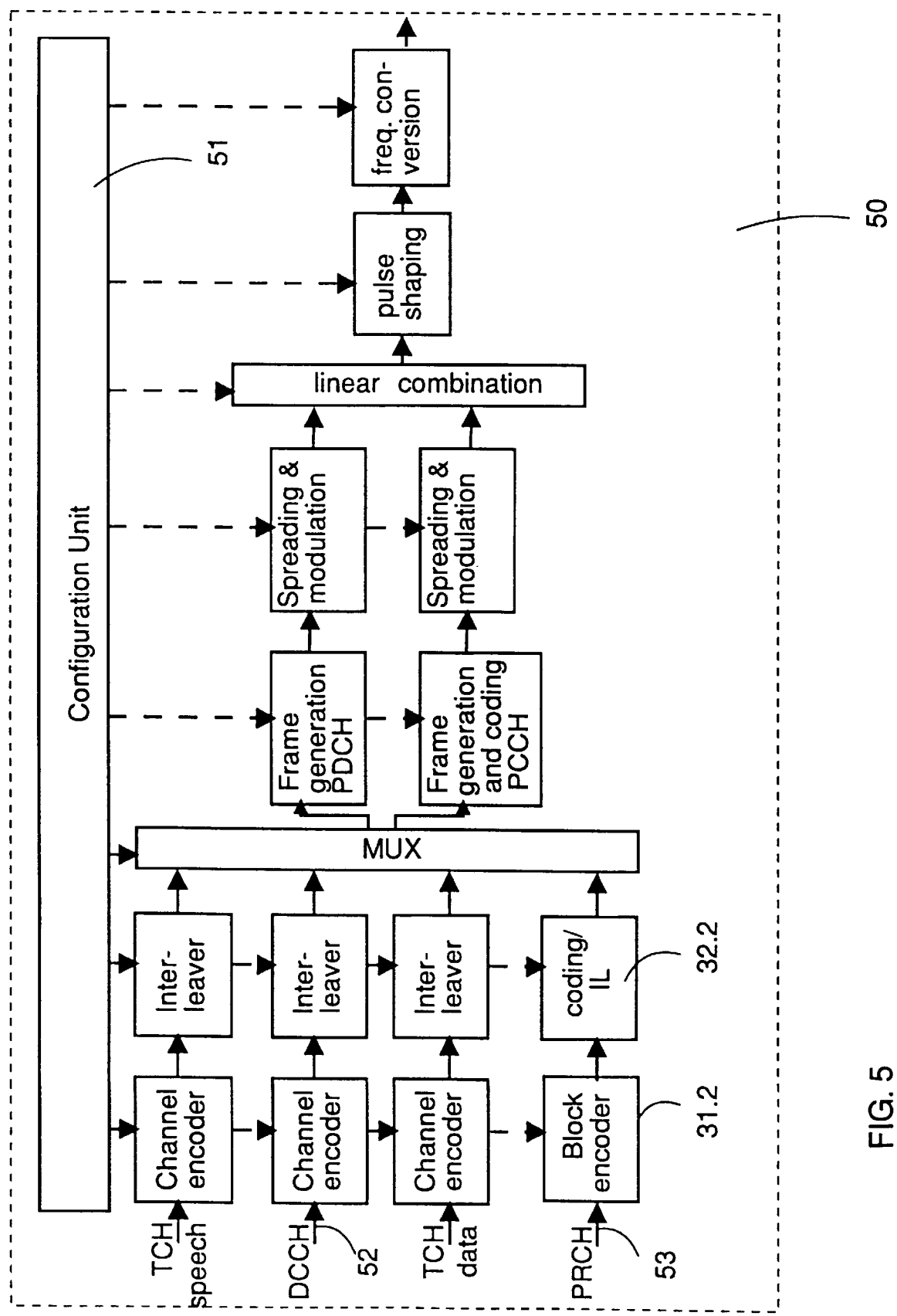
FIG. 5 is a block diagram used to illustrate the transmission scheme of the present invention.

A possible implementation of a part of a transmitter 50, including the present invention, is shown in FIG. 5. This transmitter is based on the one described in an article called "A CDMA-Based Radio Access Design for UMTS", P.-G. Andermo et al., IEEE Personal Communications, February 1995, pp. 48–53. Positioned on top is a configuration unit 51. It plays a vital role, since after having received the applicable information about carrier frequency, chip rate and service identifier from the resource manager, it can control how information is coded, multiplexed and converted to RF. When a connection is established, the radio resource manager, which is located in the network, determines these parameters based on the requested service by the user, service being offered in the particular area, and the actual system load. As illustrated in FIG. 5, information to be transmitted enters from the left hand side on different logical channels. These logical channels may carry speech, user data and control information. The latter is denoted the dedicated control channel (DCCH) 52, and carries, for example, measurement reports, handover commands, etc., while the former two and the inventive packet channel 53 fall into the category of traffic channels, denoted TCH/S, TCH/D, and PRCH, respectively. The inventive packet service is achieved by providing a block encoder 31.2, followed by a convolutional encoder and interleaver 32.2, as illustrated in FIGS. 2A, 2B and 5.

According to another embodiment of the present invention the user data rates on the packet data channel may be allocated in a dynamic fashion, e.g. depending on the current traffic load on this channel.

The present packet data transmission scheme provides for high packet throughput with an emphasis on packets of short length. However, it is equally suited for other messaging and packet applications such as e-mail, tele-shopping and tele-banking, and vehicle-dispatch or fleet management applications, for example.

What is claimed is:

1. Method for the wireless transmission of data packets in a code division multiple access communication system wherein one of the code division multiple access channels (PRCH) is used in a time-shared fashion for the transmission of the data packets from several transmitting stations (MSy, MSz) to a receiving station (BS), comprising the following steps:

sending a request from a transmitting station (MSy) to the corresponding receiving station (BS) of said communication system indicating the destination address to which said data packet(s) are to be routed, registering said transmitting station (MSy) and assigning an unique virtual connection identifier (VCIy) to it, attaching said transmitting station (MSy) to said code division multiple access channel (PRCH) used for the transmission of data packets, listening to the downlink of said code division multiple access channel (PRCH) used for the transmission of data packets until the corresponding receiving station (BS) broadcasts that it will be "idle" such that a random access to said code division multiple access channel (PRCH) used for the transmission of data packets is allowed in the next frame, ramping up the transmission power of said transmitting station (MSy) during said next frame until a certain power level is reached, transmitting said data packet(s) and said virtual connection identifier (VCIy) over the uplink of said code division multiple access channel (PRCH) used for the transmission of data packets to said receiving station (BS), and routing said data packet(s) to said destination address, the access to said code division multiple access channel (PRCH) used for the transmission of data packets being controlled by a multiple access protocol based on carrier sensing and collision detection (CSMA/CD).

2. The method of claim 1, wherein said communication system offers a connectionless packet data services.

3. The method of claim 1, wherein at least two transmitting stations (MSx, MSz) intend to transmit data packet(s) and independently perform said power ramping and wherein said receiving station (BS) limits the total power of all contending transmitting stations (MSx, MSz) to a target power.

4. The method of claim 1, wherein said receiving station (BS) indicates to said transmitting station (MSy) the data rate to be used on the uplink of said code division multiple access channel (PRCH) used for the transmission of data packets during the next frame or frames.

5. The method of claim 1, wherein power control information is fed back from said receiving station (BS) to said transmitting station (MSy) during the power ramping step.

6. The method of claim 1, wherein a transmitting station (MS) is registered only if traffic load on the network permits.

7. The method of claim 1, wherein a long spreading code is used to transmit the data packet(s).

8. The method of claim 7, wherein an inner convolutional code in conjunction with an outer cyclic redundancy check (CRC) code is used.

9. The method of claim 1, wherein coherent demodulation is employed on the uplink and downlink of said code division multiple access channel (PRCH) used for the transmission of data packets.

10. The method of claim 9, wherein the physical control channel (PCCH) of said code division multiple access channel (PRCH) used for the transmission of data packets is coherently demodulated on the downlink and differentially coherently demodulated on the uplink.

11. The method of claim 1, wherein said code division multiple access channel (PRCH) used for the transmission of data packets is a full-duplex, asymmetrical channel that can be operated independently in both directions at variable user data rates up to 9.6 kbps (narrowband channel) or up to 64 kbps (mediumband channel).

12. The method of claim 1, wherein said code division multiple access channel (PRCH) used for the transmission of data packets is structured in 10 ms time frames.

13. The method of claim 1, wherein said data packet services are used for exchanging E-mail type of packets.

14. The method of claim 1 or 3, wherein said receiving station (BS) acknowledges none of the contending transmitting stations (MSx, MSz) if it is not able to detect any of their virtual connection identifiers (VCIx, VCIz).

15. The method of claim 14, wherein said contending transmitting stations (MSx, MSz) cease transmission immediately if they do not receive said acknowledgement from said receiving station (BS) and try to access said code division multiple access channel (PRCH) used for the transmission of data packets later to retransmit the whole data packet(s).

16. The method of claim 1, wherein long data packets are fragmented so as to fit into the frames of said code division multiple access channel (PRCH) used for the transmission of data packets.

17. The method of claim 1, wherein data rates on said code division multiple access channel (PRCH) used for the transmission of data packets can be allocated in a dynamic fashion, e.g. depending on the current traffic load on this code division multiple access channel (PRCH) used for the transmission of data packets.

18. Code division multiple access communication system for the wireless transmission of data packets wherein one of the code division multiple access channels (PRCH) is used in a time-shared fashion for the transmission of the data packets from several transmitting stations (MSy, MSz) to a receiving station (BS), comprising:

means for sending a request from a transmitting station (MSy) to the corresponding receiving station (BS) of said communication system indicating the destination address to which said data packet(s) are to be routed, means for registering said transmitting station (MSy) and assigning an unique virtual connection identifier (VCIy) to it, means for attaching said transmitting station (MSy) to said code division multiple access channel (PRCH) used for the transmission of data packets, means for listening to the downlink of said code division multiple access channel (PRCH) used for the transmission of data packets until said receiving station (BS) broadcasts that it will be "idle" such that a random access to said code division multiple access channel (PRCH) used for the transmission of data packets is allowed in the next frame, means for ramping up the transmission power of said transmitting station (MSy) during said next frame until a certain power level is reached, means for transmitting said data packet(s) and said virtual connection identifier (VCIy) over the uplink of said code division multiple access channel (PRCH) used for the transmission of data packets to said receiving station (BS), and means for routing said data packet(s) to said destination address, means for controlling the access to said code division multiple access channel (PRCH) used for the transmission of data packets by a multiple access protocol based on carrier sensing and collision detection (CSMA/CD).

19. Transceiver for use in a code division multiple access communication system for the wireless transmission of data packets, wherein one of the code division multiple access channels (PRCH) is used in a time-shared manner for the transmission of the data packets from several stations (MSy, MSz) to a receiving station (BS), comprising:

means for sending a transmission request from a station (MSy) to the corresponding receiving station (BS) of said communication system indicating the destination address to which said data packet(s) are to be routed, means for attaching said station (MSy) to said code division multiple access channel (PRCH) used for the transmission of data packets, means for listening to the downlink of said channel (PRCH) until said receiving station (BS) broadcasts that it will be "idle" such that a random access to said code division multiple access channel (PRCH) used for the transmission of data packets is allowed in the next frame, means for ramping up the transmission power of said station (MSy) during said next frame until a certain power level is reached, and means for transmitting said data packet(s) and said virtual connection identifier (VCIy) over the uplink of said code division multiple access channel (PRCH) used for the transmission of data packets to said receiving station (BS).

20. The system of claim 18, wherein said receiving station (BS) comprises means to indicate to said transmitting station (MSy) the data rate to be used on the uplink of said code division multiple access channel (PRCH) used for the transmission of data packets during the next frame or frames.

21. The transceiver of claim 19, wherein said transmitting station (MSy) comprises means to adjust the data rate to be used on the uplink of said code division multiple access channel (PRCH) used for the transmission of data packets as indicated by a receiving station (BS).

22. The system of claim 18 or the transceiver of claim 19, comprising means for encoding data packet(s) to be transmitted by a long spreading code.

23. The system of claim 18, wherein said code division multiple access channel (PRCH) used for the transmission of data packets is a full-duplex, asymmetrical channel that can be operated independently in both directions at variable user data rates up to 9.6 kbps (narrowband channel) or up to 64 kbps (mediumband channel).

24. The system of claim 18, wherein said code division multiple access channel (PRCH) used for the transmission of data packets is structured in 10 #ms time frames.

25. The transceiver of claim 19, comprising means to fragment long data packets so as to fit them into the frames of said code division multiple access channel (PRCH) used for the transmission of data packets.

* * * * *

UNITED STATES PATENT AND TRADEMARK OFFICE
CERTIFICATE OF CORRECTION

PATENT NO. : 6,181,683 B1
DATED : January 30, 2001
INVENTOR(S) : Chevillat et al.

It is certified that error appears in the above-identified patent and that said Letters Patent is hereby corrected as shown below:

Title page, column 2 under (57) Abstract,
Line 34, change "controller" to -- controlled --.

Columns 1 and 2, delete the Summary of the Invention in its entirety and replace with the following:

-- This has been achieved by the wireless transmission of data packets over a code division multiple access channel (PRCH). This channel is one of several code division multiple access channels of the code division multiple access communication system. The packets are transmitted over this code division multiple access channel (PRCH) in a time-shared fashion. The inventive method comprises the following steps:

sending a request from a transmitting station (Msy) to the corresponding receiving station (BS) of said communication system indicating the destination address to which said data packet(s) are to be routed, registering said transmitting station (Msy) and assigning a unique virtual connection identifier (VCIy) to it, switching said transmitting station (Msy) to said code division multiple access channel (PRCH) used for the transmission of data packets listening to the downlink of said code division multiple access channel (PRCH) used for the transmission of data packets until the corresponding receiving station (BS) broadcasts that it will be "idle". i.e. that random access to said code division multiple access channel (PRCH) used for the transmission of data packets is allowed in the next frame, ramping up the transmission power of said transmitting station (Msy) during said next frame until a certain power level is reached, transmitting said data packet(s) and said virtual connection identifier (VcIy) over the uplink of said code division multiple access channel (PRCH) used for the transmission of data packets to said receiving station (BS), and rerouting said data packet(s) to said destination address, the access to said code division multiple access channel (PRCH) used for the transmission of data packets being controlled by a multiple access protocol based on carrier sensing and collision detection (CSMA/CD) --

UNITED STATES PATENT AND TRADEMARK OFFICE
CERTIFICATE OF CORRECTION

PATENT NO. : 6,181,683 B1
DATED : January 30, 2001
INVENTOR(S) : Chevillat et al.

It is certified that error appears in the above-identified patent and that said Letters Patent is hereby corrected as shown below:

Column 7,
Line 44, begin a new paragraph before "Since".

Column 12,
Line 38, delete "#".

Signed and Sealed this

Twenty-fifth Day of September, 2001

*Attest:*

Nicholas P. Godici

NICHOLAS P. GODICI
*Attesting Officer*    *Acting Director of the United States Patent and Trademark Office*